US00RE36498E

United States Patent [19]

Howe et al.

[11] E Patent Number: Re. 36,498

[45] Reissued Date of Patent: Jan. 18, 2000

[54] SENSOR WITH SEPARATE ACTUATOR AND SENSE FINGERS

[75] Inventors: Roger T. Howe, Martinez, Calif.; Stephen Bart, Newton, Mass.

[73] Assignee: Analog Devices, Norwood, Mass.

[21] Appl. No.: 09/172,541

[22] Filed: Oct. 14, 1998

Related U.S. Patent Documents

Reissue of:

[64] Patent No.: 5,565,625
Issued: Oct. 15, 1996
Appl. No.: 08/347,795
Filed: Dec. 1, 1994

[51] Int. Cl.[7] ..... G01P 15/08

[52] U.S. Cl. ..... 73/514.16; 73/862.451; 73/763

[58] Field of Search ..... 73/514.16, 514.35, 73/517 R, 516 R, 517 AV, 518, 763, 862.392, 862.451

[56] References Cited

U.S. PATENT DOCUMENTS

| | | | |
|---|---|---|---|
| 4,584,885 | 4/1986 | Cadwell | 73/862 |
| 4,663,972 | 5/1987 | Gerard | 73/517 |
| 4,711,128 | 12/1987 | Boura | 73/51 |
| 4,896,098 | 1/1990 | Haritonidis et al. | 324/663 |
| 5,015,850 | 5/1991 | Zdeblick et al. | 250/306 |
| 5,025,346 | 6/1991 | Tang et al. | 73/517 |
| 5,083,466 | 1/1992 | Holm-Kennedy et al. | 73/517 |
| 5,181,156 | 1/1993 | Gutteridge et al. | 73/517 |
| 5,189,914 | 3/1993 | White | 73/599 |
| 5,331,853 | 7/1994 | Hulsing, II | 73/505 |
| 5,345,824 | 9/1994 | Sherman et al. | 73/517 |
| 5,417,312 | 5/1995 | Tsuchitani | 73/517 |
| 5,447,068 | 9/1995 | Tang | 73/514 |
| 5,565,625 | 10/1996 | Young | 110/243 |
| 5,880,369 | 3/1999 | Samuels et al. | 73/514.32 |
| 5,880,921 | 3/1999 | Tham et al. | 361/233 |

FOREIGN PATENT DOCUMENTS

| | | |
|---|---|---|
| 0582797 | 2/1994 | European Pat. Off. . |
| 0605303 | 7/1994 | European Pat. Off. . |
| 0606115 | 7/1994 | European Pat. Off. . |

OTHER PUBLICATIONS

W. Henroin et al., Wide Dynamic Range DirectDigital Accelerometer, 1990.

F. Rudolf et al., Silicon Microaccelerometer (no date).

*Primary Examiner*—Max Noori

*Attorney, Agent, or Firm*—Hale and Dorr LLP

[57] ABSTRACT

A micromachined force sensor containing separate sensing and actuator structures. A member is suspended above the substrate so that it is movable along an axis in response to a force. The member includes a set of parallel sense fingers and a separate set of parallel force fingers. The sense fingers are positioned between fingers of two sense plates, to form a first differential capacitor, whose capacitance changes when the member moves in response to a force along the axis. The change in capacitance induces a sense signal on the member, which permits the measurement of the magnitude and duration of the force. The force fingers are positioned between fingers of two actuator plates, to form a second differential capacitor. The sense signal can be used to provide feedback to the second differential capacitor to generate different electrostatic forces between the force fingers and the two actuator plates, to offset the force applied along the preferred axis. Limit stops limit the movement of the member to less than the distance between the electrodes of the differential capacitors, to prevent contact between the electrodes. Additional fingers be positioned around the differential capacitors to minimize parasitic capacitances.

39 Claims, 2 Drawing Sheets

SENSOR WITH SEPARATE ACTUATOR AND SENSE FINGERS

Matter enclosed in heavy brackets [ ] appears in the original patent but forms no part of this reissue specification; matter printed in italics indicates the additions made by reissue.

FIELD OF THE INVENTION

This invention relates to the field of force and motion-sensing detectors and, more particularly, to surface-micromachined sensors.

BACKGROUND OF THE INVENTION

Micromachined silicon structures frequently are used as sensors and actuators, and for signal processing. For example, in some existing micromachined sensors, micromachined silicon structures are used to detect and measure acceleration, and sometimes use electrostatic or other forces to restore a movable member to its original position. Acceleration may be measured with piezoresistors or capacitors, typically a differential capacitor.

In a capacitive system, the movable member is positioned midway between two plates so that one capacitor is formed by one plate and the member and a second (and equal) capacitor is formed by the second plate and the member. To maximize the capacitance, the member may contain numerous fingers that are interleaved between fingers from the two plates. Various shapes and arrangements of the capacitor plates have been used.

In one such system, the application of a force along a sensitive axis causes the member to move relative to the plates, causing a change in the capacitances of the two capacitors of the differential capacitor, and a signal appears on the member that reflects the amount of acceleration. This signal may be fed back to the member with a negative feedback loop, to create electrostatic forces that will offset the acceleration and maintain the member centered between the plates. An accelerometer based on this principle and a process for fabricating such an accelerometer are described in commonly assigned U.S. Pat. Nos. 5,345,824, 5,326,726, and 5,314,572.

Although this structure is well-suited to measure large accelerations (on the order of 50 g's), it is inadequate to measure accelerations on the order of 5 's, where greater sensitivity is required. In order to obtain this greater sensitivity, it is important to reduce electrostatic forces and parasitic capacitances in the sensing function. The present invention solves this problem as set forth in the remainder of the specification referring to the drawings.

SUMMARY OF THE INVENTION

The present invention is directed to a sensor that is configured to have the sensing and feedback functions separated, while maximizing the symmetry and sensitivity of the sensing structures. As the sensor is designed to measure small accelerations, the sensor of the present invention has such a compliant suspension that, unless prevented, large accelerations would cause the member fingers to touch the plate fingers. Features are etched into the structure which limit the travel of the sensor and prevent contact, which could result in permanent attachment of the member and plate fingers.

In the sensor of the present invention, a movable member is made by forming a polysilicon beam above a silicon substrate. In a preferred embodiment, between the member and the substrate is an n+ doped emitter diffusion region, which serves as a bootstrap electrode to reduce capacitance between the substrate and the beam. Suspension arms connect the ends of the beam to four anchors. The suspension arms permit the beam to move along a principal axis in response to a force along that axis.

The member has a series of parallel fingers extending transverse to its principal axis, preferably on either side. The two end fingers on either side of the member are separated from the remaining fingers by polysilicon shields anchored to the bootstrap diffusion.

A first set of polysilicon sense plates extend parallel to and to the left of each of the middle member fingers, and a second set of polysilicon sense plates extend parallel to and to the fight of each of the middle member fingers. The sense plates are not connected to the member. All of the first set of polysilicon sense plates are connected, as are all of the second set of polysilicon sense plates. The interleaving of the two sets of sense plates and the middle member fingers forms a differential sense capacitor. The capacitance of the sense differential capacitor will vary in response to a force along the principal axis, which causes the member fingers to move relative to the sense plates.

The sense plates are connected to two high frequency signals of the same amplitude and frequency, but 180 degrees out of phase. When no force component parallel to the sensitive axis is applied to the sensor, the high frequency signals on the member cancel each other. However, when a force is applied parallel to the sensitive axis, the member and its fingers move relative to the sense plates, and the change in capacitances causes the high frequency signal, with its amplitude modulated in proportion to the force, to appear on the member. This permits the measurement of the force.

The feedback function is provided with separate actuator plates. A first set of polysilicon actuator plates extend parallel to and to the left of each of the four end member fingers, and a second set of polysilicon actuator plates extend parallel to and to the fight of each of the four end member fingers. The actuator plates are not connected to the member. All of the first set of actuator plates are connected, as are all of the second set of actuator plates. The interleaving of the two sets of actuator plates and the end member fingers forms a force differential capacitor. As with the sense differential capacitor, a force along the principal axis causes the member fingers to move relative to the actuator plates.

The actuator plates are connected to two different biasing voltages. When no force is applied to the sensor, the member is maintained at a potential midway between the two biasing voltages, which causes no net electrostatic force on the member. When a force is applied, a feedback loop may be used to apply a voltage to the member that will create a net electrostatic force on the member. The different electrostatic forces between the member fingers and the two sets of actuator plates push the member back toward its original position. The electric circuits for the sense circuit and the actuator circuit are described in commonly assigned U.S. patent application No. 08/347,703, entitled Electric Field Attraction Minimization Circuit, and filed Dec. 1, 1994 by Stephen R. Lewis and Yang Zhao, which is incorporated herein by reference.

Polysilicon shield plates electrically isolate the actuator plates from the sense plates and the suspension arms.

To prevent the member fingers from moving into the sense plates or the actuator plates in response to a force along the principal axis, the suspension arms include protrusions to limit the movement of the member.

An object of the present invention to provide an improved sensor.

Another object of the present invention to provide a micromachined sensor that is less sensitive to electrostatic forces and parasitic capacitances.

A further object of the present invention to provide a micromachined sensor in which the sensor electrodes are prevented from contacting each other when the sensor is exposed to large accelerations.

DETAILED DESCRIPTION OF THE INVENTION

The present invention is a sensor that has its sense and feedback functions separated, while maximizing the symmetry and sensitivity of the sensing structures.

Figure 1:
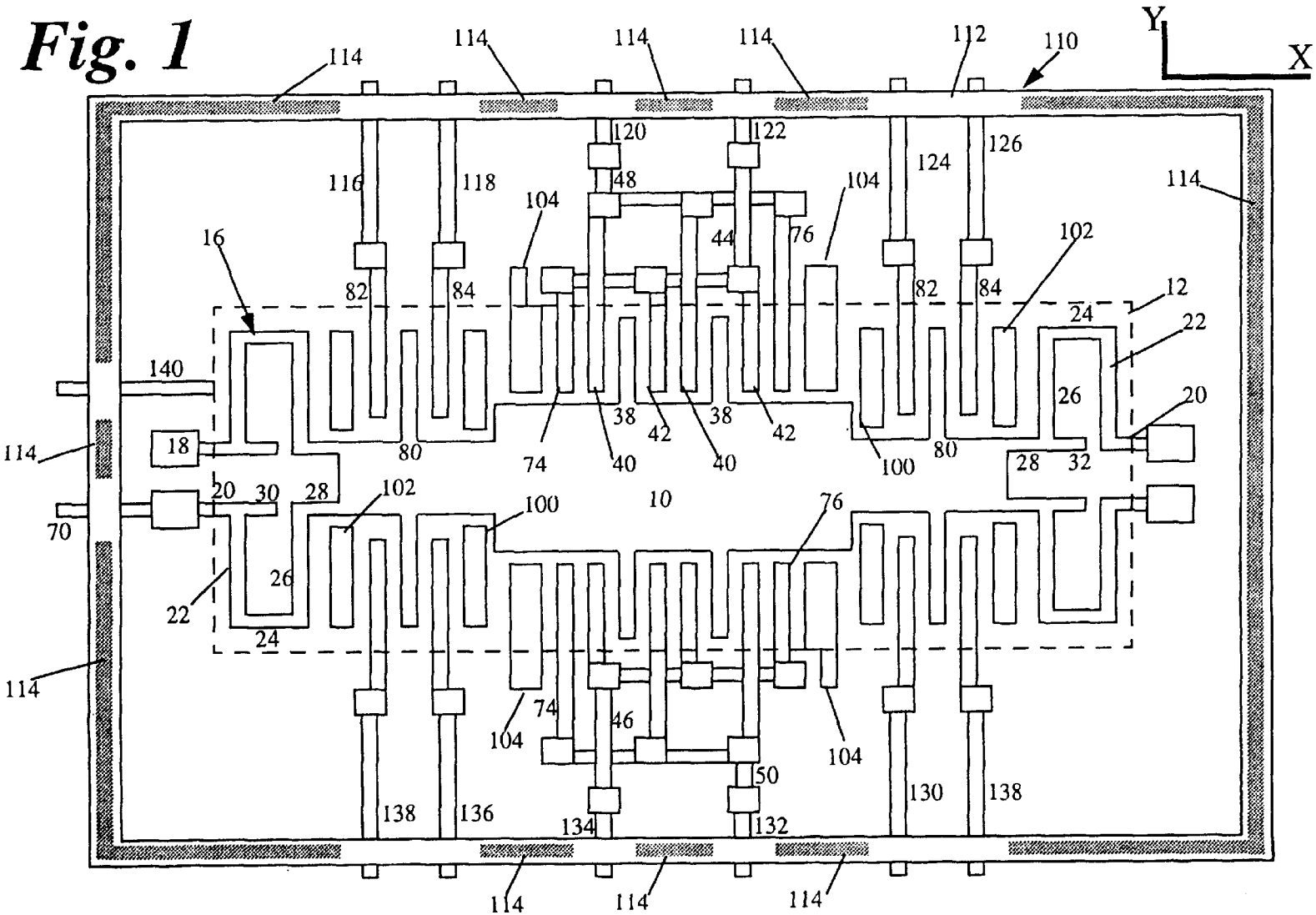
FIG. 1 is a top view of a micromachined differential capacitor sensor of the present invention.

A top view of the sensor structure is shown in FIG. 1. Member 10 is a polysilicon structure suspended above bootstrap diffusion layer 12. In a preferred embodiment, member 10 is approximately 450 micrometers long, the middle portion is approximately 80 micrometers wide, and the end portions are approximately 40 micrometers wide. Bootstrap diffusion layer 12 is formed from an n+ doped emitter diffusion region in the substrate. Member 10 is parallel to the surface of the substrate.

Member 10 is connected to suspension arms 16, which attach to anchors 18. Suspension arms 16 and anchors 18 are formed from polysilicon. Anchors 18 are mounted on the substrate outside bootstrap diffusion layer 12. In a preferred embodiment, anchors 18 are square, with sides approximately 8 micrometers long.

In a preferred embodiment, suspension arms 16 consist of segments 20, 22, 24, 26, and 28, all of which are approximately 1.9 micrometers wide. Long segments 22 and 26 are parallel to each other, connected at one end by short segment 24. Short segments 20 and 28 connect the other (non-connected) ends of long segments 22 and 26 to an anchor 18 and an end of member 10, respectively. Long segments 22 and 26 are flexible, allowing member 10 to move along the X-axis in response to a force along the X-axis, as the non-connected ends of long segments 22 and 26 move closer together or further apart. In a preferred embodiment, long segments 22 and 26 are approximately 125–130 micrometers long. Alternatively, other shapes can be used for the suspension arms.

To limit the amount of movement along the X-axis, limit stop 30 is attached at the free end of long segment 22 or limit stop 32 is attached at the free end of long segment 26. In either case, the limit stop points toward the other long segment Preferably, the space between the end of limit stop 30 and long segment 26, and between the end of limit stop 32 and long segment 22, is approximately 0.7 micrometers. As member 10 moves to the right along the X-axis, the non-connected ends of long segments 22 and 26 on the left end of member 10 move further apart, and the non-connected ends of long segments 22 and 26 on the fight end of member 10 move closer together. As a result, the limit stops on the right end of member 10 will limit the movement. While the limit stops are shown between the non-connected ends of long segments 22 and 26, any other arrangement that would limit the movement of member 10 could be used. Preferably, as shown, the limit stops cause contact between two structures at the same potential. Otherwise, the two structures may become permanently stuck.

Extending from the sides of member 10 along the Y-axis are parallel polysilicon sense fingers 38. In a preferred embodiment, sense fingers 38 are 4 micrometers wide and approximately 150 micrometers long, and there are 20 sense fingers on each side of member 10. However, for clarity, fewer are shown in FIG. 1.

To the left and right (along the X-axis) of each sense finger 38, and not connected to member 10, is a left sense plate 40 and a fight sense plate 42, respectively. Left sense plates 40 and right sense plates 42 are formed from polysilicon. Preferably, left sense plates 40 and fight sense plates 42 are each 4 micrometers wide and there is a 1 micrometer space between each sense plate and its adjoining sense finger 38. However, the distance between each left sense plate 40 and adjoining sense finger 38 could be different from the distance between each right sense plate 42 and adjoining sense finger 38. Limit stops 30 and 32 provide a smaller spacing than the spacing between sense fingers 38 and the adjoining sense plates 40 and 42, and movement of member 10 will not cause sense fingers 38 to touch either sense plate. Preferably, adjoining left and right sense plates 40 and 42 also are spaced approximately 1 micrometer apart.

All of the left sense plates 40 on each side of member 10 are connected together with an emitter diffusion segment, as are all of the right sense plates 42. Electrical connection to the inner set of sense plates on each side of member 10 is made with polysilicon microbridges 44 and 46. To maintain the symmetry of the structure and match any parasitic capacitance caused by the microbridges, dummy microbridges 48 and 50 extend from the outer set of sense plates on either side of member 10. The left sense plates 40 on each side of member 10 are electrically connected, as are the right sense plates 42 on each side of member 10.

Figure 2:
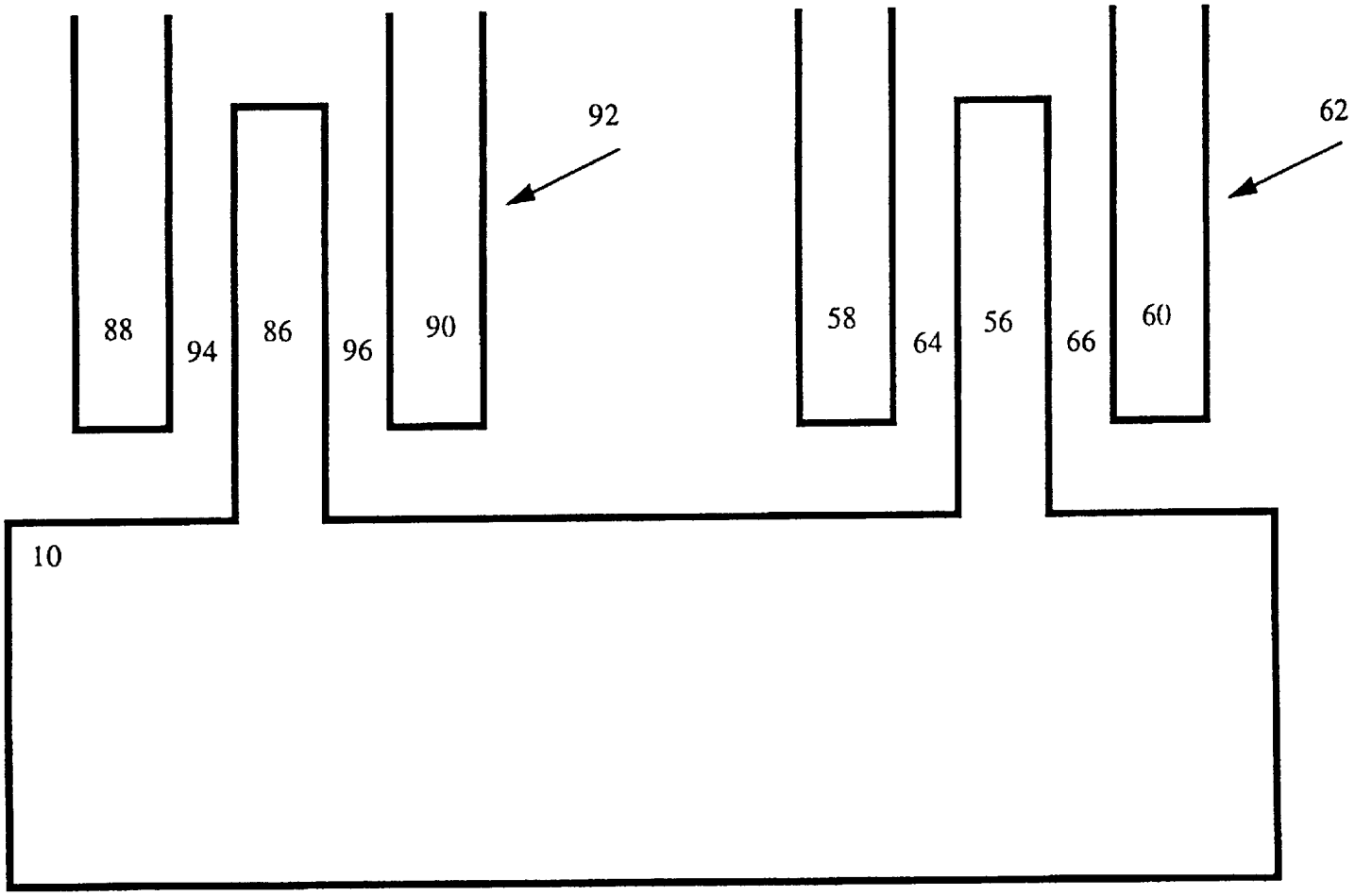
FIG. 2 is a representational diagram of the circuit formed by the differential capacitor sensor of the present invention.

Together, sense fingers 38 (which form a single electric node with the body of mass 10) form center electrode 56 of differential capacitor 62 (FIG. 2). Left sense plates 40 form left electrode 58, and fight sense plates 42 form right electrode 60 of differential capacitor 62, which consists of left capacitor 64 and fight capacitor 66. Preferably, left capacitor 64 and right capacitor 66 have the same capacitance. Each set of one sense finger 38, and its adjoining left sense plate 40 and fight sense plate 42 forms one "cell" of differential capacitor 62, with all of the cells substantially identical and connected in parallel.

When member 10 moves to the fight relative to sense plates 40 and 42, the distance between each sense finger 38 and the fight sense plate 42 of the same cell decreases, which increases the capacitance of fight capacitor 66. At the same time, the distance between each sense finger 38 and the left sense plate 40 of the same cell increases, decreasing the capacitance of left capacitor 64.

Member 10 is connected to resolving circuitry through emitter diffusion segment 70, which extends from one of the anchors 18.

In a preferred embodiment, high frequency signals (approximately 1 MHz) of the same amplitude, but 180 degrees out of phase, are applied to left sense plates 40 and right sense plates 42. When sense fingers 38 are centered between sense plates 40 and 42, no part of the high frequency signal is output from member 10 through segment 70.

When a force is applied to the sensor along the X-axis, member 10 moves relative to sense plates 40 and 42. The amount of movement is proportional to the force, in accordance with the spring constant of suspension arms 16 and the mass of member 10. This lateral movement of member 10 changes the capacitances of capacitors 64 and 66, causing a signal proportional to the magnitude of the force to be output through segment 70. For the small resulting movement of sense fingers 38, the capacitance changes almost linearly with respect to the amount of movement (and the magnitude of the force).

To the left of the leftmost left sense plate 40 on each side of member 10 is a dummy right sense plate 74. Similarly, to the fight of the rightmost right sense plate 42 on each side of member 10 is a dummy left sense plate 76. These dummy sense plates are connected to their corresponding sense plates (that is, dummy left sense plates 76 are connected to left sense plates 40 and dummy fight sense plates 74 are connected to fight sense plates 42). This ensures that the end cells of differential capacitor 62 behave the same as the middle cells.

At the ends of member 10 are four polysilicon actuator fingers 80. In a preferred embodiment, actuator fingers 80 are 4 micrometers wide and 150 micrometers long. Actuator fingers 80 are part of the same electric node as sense fingers 38 and the body of member 10. To the sides of each actuator finger 80, and not connected to member 10, are a left actuator plate 82 and a fight actuator plate 84. In a preferred embodiment, when no force is applied to member 10, actuator fingers 80 are midway between actuator plates 82 and 84. Actuator plates 82 and 84 are anchored to the substrate so as to be mirror images of each other with respect to their adjoining actuator finger 80. Each left actuator plate 82 is electrically connected, as is each right actuator plate 84.

Together, actuator fingers 80 form center electrode 86 of differential capacitor 92 (FIG. 2). Left actuator plates 82 and fight actuator plates 84 form left electrode 88 and fight electrode 90, respectively, of differential capacitor 92. Left electrode 88 and center electrode 86 form left capacitor 94, and fight electrode 90 and center electrode 86 form right capacitor 96 of differential capacitor 92.

As with differential capacitor 62, the separation between each actuator finger 80 and its adjoining actuator plates 82 and 84 changes when the sensor is subject to a force along the X-axis. However, while differential capacitor 62 is used to measure the magnitude of the force applied to the sensor, differential capacitor 92 is used to generate electrostatic forces to return member 10 to its neutral position. Biasing voltages of different amplitudes are applied to actuator plates 82 and 84. When no force is applied to the sensor, member 10 is at a potential midway between the two biasing voltages. Accordingly, there is no net electrostatic force tending to push actuator fingers 80 (and hence member 10) toward left actuator plates 82 or fight actuator plates 84. However, when member 10 moves relative to sense plates 40 and 42 (which also is movement relative to actuator plates 82 and 84), and a signal is output through segment 70, a feedback loop can be employed (not shown) to impose a biasing signal on member 10 that moves the voltage on actuator fingers 80 closer to the voltage on the closer of actuator plates 82 or 84 and further from the voltage on the further of actuator plates 82 or 84. This causes a net electrostatic force that tends to push actuator fingers 80 closer to the midway point between actuator plates 82 and 84, which moves member 10 closer to its original position.

On either side of each actuator cell consisting of an actuator finger 80 and left and right actuator plates 82 and 84 are shield plates 100 and 102. Further separating the end sense cells from the actuator cells are shield plates 104. Each shield plate 100, 102, and 104 is formed from polysilicon and is anchored to bootstrap diffusion 12, to provide electrical shielding between the sense and actuator functions and to isolate the actuator cells. The shield plates need not be rectangular, and may be formed in a shape to take advantage of the positions of the adjoining structures. Shield plates 100 and 102 also prevent actuator plates 82 and 84 from applying electrostatic forces to suspension arms 16. Shield plates 100 and 102 may be made narrower than shield plates 104.

Although the actuator cells are shown at the ends of member 10, the actuator cells could be located elsewhere along the sides of member 10 and a different number of actuator cells could be used.

In the above-described embodiment the force causes the distance between the sense capacitor electrodes to change. However, the electrodes could be positioned so that the force causes the electrodes to move parallel to each other, so that the capacitive areas change.

Surrounding the sensor is guard ring 110. Guard ring 110, which isolates the sensor, consists of polysilicon strip 112, anchored to an emitter diffusion layer by anchors 114. The emitter diffusion layer for guard ring 110 is under anchors 114. The gaps in the anchors 114 and in the underlying emitter diffusion layer permit the electrical connection of the sense and actuator plates, bootstrap diffusion layer 12, and member 10, to resolving circuitry, via emitter diffusion segments 70, 116, 118, 120, 122, 124, 126, 128, 130, 132, 134, 136, 138, and 140. Preferably, guard ring 110 is tied to either the same potential as bootstrap diffusion layer 12 or some other fixed potential.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

We claim:

1. A micromachined device comprising:

a member;

a suspension connected to the member and to a substrate, so that the member is movable relative to the substrate in response to a force applied to the device along a predetermined axis;

a sense differential capacitor having a first sense electrode connected to the substrate, a second sense electrode connected to the substrate, and a third sense electrode connected to the member, the sense differential capacitor including a first sense capacitor and a second sense capacitor, wherein the first sense capacitor includes the first sense electrode and the third sense electrode and the second sense capacitor includes the second sense electrode and the third sense electrode, and wherein the capacitances of the first sense capacitor and the second sense capacitor are oppositely variable in response to the force; and an actuator differential capacitor having a first actuator electrode connected to the substrate, a second actuator electrode connected to the substrate, and a third actuator electrode connected to the member, the actuator differential capacitor including a first actuator capacitor and a second actuator capacitor, wherein the first actuator capacitor includes the first actuator electrode and the third actuator electrode and the second actuator capacitor includes the second actuator electrode and the third actuator electrode, and wherein the capacitances of the first actuator capacitor and the second actuator capacitor are oppositely variable in response to the force;

wherein the first sense electrode forms a separate electric node from the first actuator electrode, a separate electric node from the second actuator electrode, and a separate electric node from the third actuator electrode.

2. A micromachined device comprising:

a plurality of anchors connected to a substrate;

a member suspended above the substrate:

a plurality of suspension arms suspended above the substrate, with each of the plurality of suspension arms having a first end connected to the member and a second end connected to one of the plurality of anchors, such that the member is movable along an axis parallel to the substrate;

at least one sense capacitor cell, with each sense capacitor cell including a sense finger connected to the member, a first sense plate adjacent to a first side of the sense finger, and a second sense plate adjacent to a second side of the sense finger; and at least one actuator capacitor cell, with each actuator capacitor cell including an actuator finger connected to the member, a first actuator plate adjacent to the first side of the actuator finger and a second actuator plate adjacent to the second side of the actuator finger, wherein the at least one sense capacitor cell comprises a first differential capacitor and the at least one actuator capacitor cell comprises a second differential capacitor; and wherein the first sense plate of each sense capacitor cell forms a separate electric node from the actuator finger of each actuator capacitor cell, a separate electric node from the first actuator plate of each actuator capacitor cell, and a separate electric node from the second actuator plate of each actuator capacitor cell.

3. A micromachined device comprising:

a plurality of anchors connected to a substrate:

a member suspended above the substrate having at least one member finger extending from the member, the member finger having a left side and a right side;

a plurality of suspension arms suspended above the substrate, with each of the plurality of suspension arms having a first end connected to the member and a second end connected to one of the plurality of anchors so that the member is movable along a preferred axis parallel to the substrate;

at least one left finger parallel to the at least one member finger, with one of the at least one left lingers being adjacent to the left side of each member finger, and the at least one left finger forming a first capacitor with the at least one member finger;

at least one right finger parallel to the at least one member finger, with one of the at least one right fingers being adjacent to the right side of each member finger, at the at least one right finger forming a second capacitor with the at least one member finger;

a polysilicon guard ring suspended above the substrate and encircling the member, the plurality of suspension arms, the at least one left finger, and the at least one right finger;

a guard diffusion area diffused into the substrate under a portion of the guard ring; and a polysilicon guard anchor mechanically and electrically connecting the guard ring to the guard diffusion area.

4. The device according to claim 1, wherein the distance between the first actuator electrode and the third actuator electrode changes in a first direction in response to the force and the distance between the second actuator electrode and the third actuator electrode changes in a second direction in response to the force, the second direction being opposite the first direction.

5. The device according to claim 4, further comprising means for coupling the first sense electrode to a first carrier signal and the second sense electrode to a second carrier signal of the same frequency as the first carrier signal, with the first carrier signal being 180 degrees out of phase with the second carrier signal.

6. A device according to claim 5, further comprising means for coupling the first actuator electrode to a first biasing signal having a first amplitude and the second actuator electrode to a second biasing signal having a second amplitude.

7. The device according to claim 6, wherein the first sense electrode, the second sense electrode, the third sense electrode, the first actuator electrode, the second actuator electrode, and the third actuator electrode are formed from polysilicon; and the connecting means includes a plurality of anchors connected to a silicon substrate and a plurality of suspension arms, with each of the plurality of suspension arms having a first end connected to one of the plurality of anchors and a second end connected to the member.

8. The device according to claim 7, wherein each of the first sense electrode, the second sense electrode, and the third sense electrode includes a plurality of parallel fingers, and with each of the plurality of fingers of the third sense electrode being interleaved between one of the plurality of fingers of the first sense electrode and one of the plurality of fingers of the second sense electrode.

9. A micromachined device comprising:

a plurality of anchors connected to a substrate;

a member suspended above the substrate having at least one sense finger extending from the member, and at least one force finger extending from the member, parallel to the at least one sense finger;

a plurality of suspension arms suspended above the substrate, with each of the plurality of suspension arms having a first end connected to the member and a second end connected to one of the plurality of anchors, so that the member is movable along a preferred axis parallel to the substrate;

at least one first sense plate parallel to the at least one sense finger, with one of the at least one first sense plates being adjacent to a first side of each sense finger, and the at least one first sense plate forming a first sense capacitor with the at least one sense finger;

at least one second sense plate parallel to the at least one sense finger with one of the at least one second sense plates being adjacent to a second side of each sense finger, and the at least one second sense plate forming a second sense capacitor with the at least one sense finger;

at least one first actuator plate parallel to the at least one force finger, with one of the at least one first actuator plates being adjacent to the first side of each force finger, and the at least one first actuator plate forming a first actuator capacitor with the at least one force finger; and at least one second actuator plate parallel to the at least one force finger, with one of the at least one second actuator plates being adjacent to the second side of each force linger, and the at least one second actuator plate forming a second actuator capacitor with the at least one force finger;

wherein the at least one first sense plate forms a separate electric node from the at least one force finger, a separate electric node from the at least one first actuator plate, and a separate electric node from the at least one second actuator plate.

10. The device according to claim 9, wherein the at least one sense finger includes a plurality of sense fingers, parallel to each other, the at least one first sense plate includes a plurality of first sense plates, and the at least one second sense plate includes a plurality of second sense plates.

11. The device according to claim 10, wherein the at least one force finger includes a plurality of force fingers, the at least one first actuator plate includes a plurality of first actuator plates, and the at least one second actuator plate includes a plurality of second actuator plates.

12. The device according to claim 11, further comprising a conductive bootstrap region diffused onto the substrate, below the member.

13. The device according to claim 12, further comprising:

a first plurality of shield plates anchored to the bootstrap region and parallel to the plurality of force fingers, with one of the first plurality of shield plates being adjacent to the first side of each of the plurality of first actuator plates; and a second plurality of shield plates anchored to the bootstrap region and parallel to the plurality of force fingers, with one of the second plurality of shield plates being adjacent to the second side of each of the plurality of second actuator plates.

14. The device according to claim 11, wherein at least one of the plurality of suspension arms includes a limit stop for limiting movement of the member along the predetermined axis.

15. The device according to claim 11, wherein each of the plurality of suspension arms includes an anchor segment having a first end connected to one of the plurality of anchors, a first suspension segment approximately perpendicular to the anchor segment and having a first end connected to a second end of the anchor segment, a second suspension segment having a first end connected to a second end of the first anchor segment, a third suspension segment approximately parallel to the first suspension segment and having a first end connected to a second end of the second suspension segment, and a member segment approximately perpendicular to the third suspension segment and having a first end connected to a second end of the third suspension segment and a second end connected to the member.

16. The device according to claim 15, wherein at least one of the plurality of suspension arms further includes a stop segment connected to the first suspension segment and extending from the first suspension segment toward the third suspension segment.

17. The device according to claim 15, wherein at least one of the plurality of suspension arms further includes a stop segment connected to the third suspension segment and extending from the third suspension segment toward the first suspension segment.

18. The device according to claim 11, further comprising:

a polysilicon guard ring encircling the member, the plurality of suspension arms, the plurality of first sense plates, the plurality of second sense plates, the plurality of first actuator plates, and the plurality of second actuator plates;

a guard diffusion area diffused into the substrate under a portion of the guard ring; and a polysilicon guard anchor connecting the guard ring to the guard diffusion area.

19. The device according to claim 9, further comprising:

a polysilicon guard ring suspended above the substrate and encircling the at least one sense linger, the at least one first sense plate, and the at least one second sense plate;

a guard diffusion area diffused into the substrate under a portion of the guard ring; and a polysilicon guard anchor mechanically and electrically connecting the guard ring to the guard diffusion area.

20. The device according to claim 2, wherein the at least one sense capacitor cell includes a plurality of sense capacitor cells, with all of the first sense plates being connected and all of the second sense plates connected.

21. The device according to claim 20, wherein the plurality of sense capacitor cells includes a plurality of end cells and at least one middle cell, with each end cell having an end side non-adjacent to another sense capacitor cell and a middle side adjacent to one of the at least one middle cells, and each middle cell being adjacent to two of the plurality of sense capacitor cells;

the device further including a plurality of dummy sense plates, with one of the plurality of dummy sense plates being adjacent to the end side of each of the plurality of end cells.

22. A device according to claim 21, wherein the plurality of end cells includes at least one first end cell and at least one second end cell, with the end side of each first end cell being on the first side of such first end cell, the end side of each second end cell being on the second side of such second end cell, the plurality of dummy sense plates including at least one dummy first sense plate connected to the plurality of first sense plates and at least one dummy second sense plate connected to the plurality of second sense plates, the dummy sense plate adjacent to each first end cell being a dummy first sense plate, and the dummy sense plate adjacent to each second end cell being a dummy second sense plate.

23. The device according to claim 21, wherein the at least one middle cell includes a plurality of middle cells.

24. The device according to claim 23, wherein the at least one actuator capacitor cell includes a plurality of actuator capacitor cells, with all of the first actuator plates being connected and all of the second actuator plates being connected.

25. The device according to claim 12, further comprising at least one first shield plate anchored to the bootstrap region and parallel to the plurality of force fingers, wherein each of the first shield plates is adjacent to one of the plurality of first actuator plates, on an opposite side of such first actuator plate from a side of such actuator plate adjacent to one of the force fingers.

26. The device according to claim 25, further comprising at least one second shield plate anchored to the bootstrap region and parallel to the plurality of force fingers, wherein each of the second shield plates is adjacent to one of the plurality of second actuator plates, on an opposite side of such second actuator plate from a side of such actuator plate adjacent to one of the force fingers.

27. The device according to claim 9, wherein the member, including the at least one sense finger and the at least one force finger, forms a single electric node.

28. The device according to claim 9, wherein the at least one sense finger and the at least one force finger extend from the member perpendicular to the preferred axis.

29. The device according to claim 1, wherein the member, the third sense electrode, and the third actuator electrode form a single electric node.

30. The device according to claim 9, wherein the at least one second sense plate forms a separate electric node from the at least one force finger, a separate electric node from the at least one first actuator plate, and a separate electric node from the at least one second actuator plate.

31. The device according to claim 9, further comprising at least one first shield plate anchored to the bootstrap region and parallel to the at least one force finger, wherein each of the first shield plates is adjacent to one of the at least one first actuator plates, on an opposite side of such first actuator plate from a side of such actuator plate adjacent to one of the force fingers.

32. The device according to claim 31, further comprising at least one second shield plate anchored to the bootstrap region and parallel to the at least one force finger, wherein each of the second shield plates is adjacent to one of the at least one second actuator plates, on an opposite side of such second actuator plate from a side of such actuator plate adjacent to one of the force fingers.

*33. A micromachined device comprising:*

*a plurality of anchors connected to a substrate;*

*a member suspended above the substrate having at least one member finger extending from the member, the member finger having a left side and a right side;*

*a plurality of suspension arms suspended above the substrate, with each of the plurality of suspension arms having a first end connected to the member and a second end connected to one of the plurality of anchors so that the member is movable along an axis parallel to the substrate;*

*at least one left finger parallel to the at least one member finger, with one of the at least one left fingers being adjacent to the left side of each member finger, and the at least one left finger forming a first capacitor with the at least one member finger;*

*at least one right finger parallel to the at least one member finger, with one of the at least one right fingers being adjacent to the right side of each member finger, and the at least one right finger forming a second capacitor with the at least one member finger; and*

*a conductive guard ring formed above and mechanically connected to the substrate, wherein the guard ring surrounds the member, the plurality of suspension arms, the at least one left finger, and the at least one right finger.*

*34. The device according to claim 33, wherein the conductive guard ring includes polysilicon.*

*35. The device according to claim 33, wherein the guard ring is electrically connected to the substrate.*

*36. A micromachined device comprising:*

*a plurality of anchors connected to a substrate;*

*a member suspended above the substrate having at least one member finger extending from the member, the member finger having a left side and a right side;*

*a plurality of suspension arms suspended above the substrate, with each of the plurality of suspension arms having a first end connected to the member and a second end connected to one of the plurality of anchors so that the member is movable along an axis parallel to the substrate;*

*at least one left finger parallel to the at least one member finger, with one of the at least one left fingers being adjacent to the left side of each member finger, and the at least one left finger forming a first capacitor with the at least one member finger;*

*at least one right finger parallel to the at least one member finger, with one of the at least one right fingers being adjacent to the right side of each member finger, and the at least one right finger forming a second capacitor with the at least one member finger; and*

*a conductive guard ring surrounding the member, the at least one left finger, and the at least one right finger so as to electrically isolate the member, the at least one left finger, and the at least one right finger.*

*37. The device according to claim 36, wherein the conductive guard ring is suspended above the substrate.*

*38. A micromachined device comprising:*

*a plurality of anchors connected to a substrate;*

*a member suspended above the substrate having at least one member finger extending from the member, the member finger having a left side and a right side;*

*a plurality of suspension arms suspended above the substrate, with each of the plurality of suspension arms having a first end connected to the member and a second end connected to one of the plurality of anchors so that the member is movable along an axis parallel to the substrate;*

*at least one left finger parallel to the at least one member finger, with one of the at least one left fingers being adjacent to the left side of each member finger, and the at least one left finger forming a first capacitor with the at least one member finger;*

*at least one right finger parallel to the at least one member finger, with one of the at least one right fingers being adjacent to the right side of each member finger, and the at least one right finger forming a second capacitor with the at least one member finger; and*

*a conductive guard ring formed above and mechanically connected to the substrate so as to electrically isolate the member, the at least one left finger, and the at least one right finger.*

*39. The device according to claim 38, wherein the conductive guard ring includes polysilicon.*

* * * * *